US012713050B2

(12) United States Patent
Boyce et al.

(10) Patent No.: US 12,713,050 B2

(45) Date of Patent: Aug. 18, 2026

(54) SUB-PICTURES AND SUB-PICTURE SETS WITH LEVEL DERIVATION

(71) Applicant: Intel Corporation, Santa Clara, CA (US)

(72) Inventors: Jill Boyce, Portland, OR (US); Lidong Xu, Beijing (CN)

(73) Assignee: Intel Corporation, Santa Clara, CA (US)

(*) Notice: Subject to any disclaimer, the term of this patent is extended or adjusted under 35 U.S.C. 154(b) by 47 days.

(21) Appl. No.: 18/680,800

(22) Filed: May 31, 2024

(65) Prior Publication Data

US 2024/0323422 A1 Sep. 26, 2024

Related U.S. Application Data

(63) Continuation of application No. 17/442,056, filed as application No. PCT/US2020/039123 on Jun. 23, 2020, now Pat. No. 12,101,498.

(60) Provisional application No. 62/866,156, filed on Jun. 25, 2019.

(51) Int. Cl.

| | |
|---|---|
| ***H04N 19/46*** | (2014.01) |
| ***H04N 19/136*** | (2014.01) |
| ***H04N 19/146*** | (2014.01) |
| ***H04N 19/167*** | (2014.01) |

(Continued)

(52) U.S. Cl.

CPC ........... *H04N 19/46* (2014.11); *H04N 19/136* (2014.11); *H04N 19/146* (2014.11); *H04N 19/167* (2014.11); *H04N 19/172* (2014.11); *H04N 19/42* (2014.11)

(58) Field of Classification Search

None

See application file for complete search history.

(56) References Cited

U.S. PATENT DOCUMENTS

| | | | | |
|---|---|---|---|---|
| 7,535,383 | B2 * | 5/2009 | Segall .................... | H04N 19/61 341/51 |
| 8,989,508 | B2 | 3/2015 | Deshpande | |
| 9,106,897 | B2 | 8/2015 | Yuan et al. | |

(Continued)

FOREIGN PATENT DOCUMENTS

| | | |
|---|---|---|
| EP | 2898684 | 5/2019 |
| JP | 2015533060 | 11/2015 |

(Continued)

OTHER PUBLICATIONS

Muhammed Coban, Ye-Kui Wang, Marta Karczewicz, Support of independent sub-pictures, and JCTVC-10356, Joint Collaborative Team on Video Coding (JCT-VC) of ITU-TSG 16 WP 3 and ISO/IEC JTC 1/SC 29/WG 11 9th Meeting: Geneva, Apr. 27-May 7, 2012, 5 pages.

(Continued)

*Primary Examiner* — Stefan Gadomski

(74) *Attorney, Agent, or Firm* — Hanley, Flight & Zimmerman, LLC

(57) ABSTRACT

Disclosed examples populate a supplemental enhancement information (SEI) message with a value corresponding to a number of subpictures of a video sequence; populate a level indicator in the SEI message; populate a subpicture identifier; populate the subpicture identifier in a slice header, and cause the SEI message and the slice header to be included in a video bitstream.

19 Claims, 7 Drawing Sheets

(51) Int. Cl.
*H04N 19/172* (2014.01)
*H04N 19/42* (2014.01)

(56) References Cited

U.S. PATENT DOCUMENTS 9,503,753 B2 11/2016 Wang
11,140,399 B1* 10/2021 Keating ............... H04N 19/172
2005/0254575 A1* 11/2005 Hannuksela ........... H04N 19/30 375/240.1
2006/0050790 A1* 3/2006 Eerenberg ............. H04N 19/61 375/E7.18
2007/0292107 A1 12/2007 Yahata et al.
2008/0013621 A1* 1/2008 Wang ..................... H04N 19/33 375/E7.182
2009/0080519 A1* 3/2009 Jeong ..................... H04N 19/63 375/E7.104
2012/0075436 A1* 3/2012 Chen .................... H04N 13/161 348/51
2012/0201306 A1* 8/2012 Kang ................. H04N 21/4345 375/E7.243
2013/0176389 A1* 7/2013 Chen .................... H04N 19/597 348/43
2013/0195205 A1* 8/2013 Wang ..................... H04N 19/46 375/240.26
2013/0202051 A1* 8/2013 Zhou .................... H04N 19/521 375/240.26
2013/0266077 A1* 10/2013 Boyce .................. H04N 19/463 375/240.25
2014/0003489 A1* 1/2014 Hannuksela ........... H04N 19/30 375/240.02
2014/0079116 A1 3/2014 Wang
2014/0086333 A1* 3/2014 Wang .................. H04N 21/235 375/240.26
2014/0092963 A1* 4/2014 Wang ..................... H04N 19/70 375/240.12
2014/0355692 A1 12/2014 Ramasubramonian et al.
2015/0103912 A1* 4/2015 Lee ...................... H04N 19/573 375/240.15
2015/0208095 A1* 7/2015 Schierl ................... H04N 19/70 375/240.28
2015/0312584 A1 10/2015 Boyce
2015/0365686 A1* 12/2015 Kang ..................... H04N 19/70
2016/0119632 A1* 4/2016 Lee ...................... H04N 19/463 375/240.12
2017/0302920 A1* 10/2017 Pettersson ............ H04N 19/109
2018/0199071 A1* 7/2018 Wang ............... H04N 21/85406
2018/0242028 A1 8/2018 Van Brandenburg et al.
2018/0255323 A1 9/2018 Wang
2018/0270287 A1 9/2018 Ouedraogo et al.
2019/0014337 A1 1/2019 Skupin et al.
2019/0020884 A1 1/2019 Skupin et al.
2019/0149838 A1 5/2019 Zhang et al.
2019/0158880 A1* 5/2019 Deshpande ............ H04N 19/31
2019/0253738 A1 8/2019 Houze
2019/0342581 A1 11/2019 Deshpande
2020/0204813 A1 6/2020 Choi et al.
2020/0260063 A1* 8/2020 Hannuksela ... H04N 21/234345
2021/0112246 A1* 4/2021 Aono ................... H04N 19/172
2021/0211694 A1 7/2021 Skupin
2021/0227231 A1* 7/2021 Hannuksela ......... H04N 19/176
2022/0141488 A1 5/2022 He
2022/0150487 A1* 5/2022 Lim ..................... H04N 19/176
2022/0174304 A1 6/2022 Boyce et al.

FOREIGN PATENT DOCUMENTS

KR 20150048842 5/2015
WO 2020263817 12/2020

OTHER PUBLICATIONS

Byeongdoo Choi, Stephan Wenger, and Shan Liu, AHG12: On sub-picture partitioning, Joint Video Experts Team (JVET) of ITU-T SG 16 WP 3 and ISO/IEC JTC 1/SC 29/WG 11, JVET-N0055v2, 14th Meeting: Geneva, CH, Mar. 2019, pp. 1-7, 8 pages.
Japanese Patent Office, "Decision to Grant a Patent" issued in connection with Japanese Patent Application No. 2021-568820, dated Oct. 29, 2024, 5 pages. [English Translation Included].
Patent Cooperation Treaty, "International Preliminary Report on Patentability," issued in connection with International Patent Application No. PCT/US2020/039123, mailed on Jan. 6, 2022, 7 pages.
Intellectual Property of India, "Hearing Notice," issued in connection with Indian Patent Application No. 202147039643, dated May 31, 2024, 3 pages. [English Translation Included].
United States Patent and Trademark Office, "Notice of Allowance and Fee(s) Due," issued in connection with U.S. Appl. No. 17/442,056, dated Jun. 25, 2024, 5 pages.
Japanese Patent Office, "Search Report by Registered Search Organization," issued in connection with Japanese Patent Application No. 2021-568820, dated Jun. 28, 2024, 37 pages. [English Translation Included].
Japanese Patent Office, "Notice of Reasons for Refusal," issued in connection with Japanese Patent Application No. 2021-568820, dated Jul. 2, 2024, 10 pages. [English Translation Included].
European Patent Office, "Communication pursuant to Rules 70(2) and 70a(2) EPC," issued in connection with European Patent Application No. 20831223.1, dated Jun. 16, 2023, 1 page.
European Patent Office, "Communication pursuant to Article 94(3) EPC," issued in connection with European Patent Application No. 20831223.1, dated Mar. 14, 2025, 4 pages.
International Searching Authority, "International Search Report," issued Sep. 29, 2020 in connection with International Patent Application No. PCT/US2020/039123, 3 pages.
International Searching Authority, "Written Opinion," issued Sep. 29, 2020 in connection with International Patent Application No. PCT/US2020/039123, 5 pages.
European Patent Office, "Extended European Search Report," issued May 30, 2023, in connection with European Patent Application No. 20831223.1, 7 pages.
Boyce, "Sub-Picture Design Principles," JVET of ITU-T SG 16 WP3 and ISO/IEC JTC 1/SC 29/WG 11, 14th Meeting: Geneva, CH, Mar. 19-27, 2019, 1 page.
Boyce, "Sub-Picture and Sub-Picture Sets with Level Derivaton," JVET of ITU-T SG 16 WP3 and ISO/IEC JTC 1/SC 29/WG 11, 15th Meeting: Gothenburg, SE, Jul. 3-12, 2019, 11 pages.
Intellectual Property India, "Examination Report," issued Jun. 27, 2023, in connection with Indian Patent Application No. 202147039643, 9 pages.
Boyce et al., "AHG14/AHG8/AHG17: Sections for intra refresh and inloop filter disabling," Document: JVET-N0275, Joint Video Experts Team (JVET) of ITU-T SG 16 WP 3 and ISO/IEC JTC 1/SC 29/WG 11, 14th Meeting: Geneva, CH, Mar. 19-27, 2019, published Mar. 22, 2019, 18 pages.
Boyce et al., "JVET-N00275: AHG14/AHG8/AHG17: Sections for intra refresh and inloop filter disabling," Joint Video Experts Team (JVET) of ITU-T SG 16 WP 3 and ISO/IEC JTC 1/SC 29/WG 11, 14th Meeting: Geneva, CH, Mar. 19-27, 2019, published Mar. 22, 2019, 18 pages.
United States Patent and Trademark Office, "Non-Final Office Action," issued Jul. 20, 2023 in connection with U.S. Appl. No. 17/442,056, 18 pages.
United States Patent and Trademark Office, "Final Office Action," issued Jan. 25, 2024 in connection with U.S. Appl. No. 17/442,056, 17 pages.
United States Patent and Trademark Office, "Advisory Action," issued Mar. 13, 2024 in connection with U.S. Appl. No. 17/442,056, 3 pages.
United States Patent and Trademark Office, "Notice of Allowance," issued Apr. 25, 2024 in connection with U.S. Appl. No. 17/442,056, 8 pages.

(56) References Cited

OTHER PUBLICATIONS

Korean Intellectual Property Office, “Examination Report (Request for the Submission of an Opinion),”issued in connection with Korean Patent Application No. 10-2021-7038405, dated Sep. 1, 2025, 12 pages. [English machine translation included].

* cited by examiner

SUB-PICTURES AND SUB-PICTURE SETS WITH LEVEL DERIVATION

RELATED APPLICATIONS

This patent arises from a continuation of U.S. patent application Ser. No. 17/442,056, filed on Sep. 22, 2021 and entitled "SUB-PICTURES AND SUB-PICTURE SETS WITH LEVEL DERIVATION," which is a U.S. National Stage Patent Application under 35 U.S.C. § 371 of PCT Patent Application No. PCT/US2020/039123, filed Jun. 23, 2020, and entitled "SUB-PICTURES AND SUB-PICTURE SETS WITH LEVEL DERIVATION," which claims priority to U.S. Provisional Patent Application No. 62/866,156, filed Jun. 25, 2019, and entitled "SUB-PICTURES AND SUB-PICTURE SETS WITH LEVEL DERIVATION." U.S. patent application Ser. No. 17/442,056, PCT Patent Application No. PCT/US2020/039123 and U.S. Provisional Patent Application No. 62/866,156 are hereby incorporated herein by reference in their entireties.

BACKGROUND

Video encoding and decoding is useful to reduce the amount of data that is transmitted to process video information. A video codec refers to an electronic circuit or software that compresses or decompresses digital video. For example, a video codec converts uncompressed video to a compressed format or decompresses a compressed format to uncompressed video. Examples of compressed video formats include MP4, 3GP, OGG, WMV, FLV, AVI, MPEG-2 PS, MPEG, VOB, VP9, among numerous others. Example video codecs include H.264, high-efficiency video coding (HEVC), MPEG-4, QUICKTIME, DV, among numerous others.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1A:
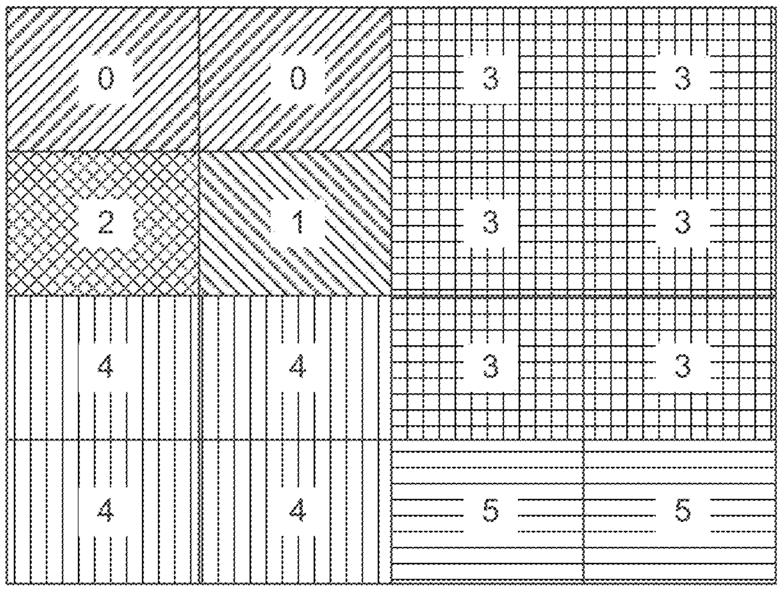
FIG. 1A is an illustrative diagram of an example of valid sub-picture grid values according to an embodiment.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, systems, and articles are described herein related to video systems. More particularly, embodiments relate to sub-pictures and sub-picture sets with level derivation.

For use in video coding (e.g., including a video coding standard), an embodiment of a bitrate efficient mechanism may enable derivation of a conformance point for a sub-region of coded pictures in a coded video sequence.

In the high-efficiency video coding (HEVC) video coding standards, for each coded video sequence (CVS), syntax elements for profile, tier, and level indicators are signaled in the bitstream to define conformance of the bitstream, and enable interoperability of decoders that conform to the particular profile, tier, and level. The signaled profile, tier, and level correspond to the video sequence containing the entire picture.

HEVC includes a Supplemental Enhancement Information (SEI) message for Temporal Motion Constrained Tile Sets, which can indicate sub-regions of a picture in a sequence, called tile sets, which can be independently decoded. Tier and level information can optionally be sent for tiles or tile sets.

When using the HEVC Temporal Motion Constrained Tile Sets SEI message, groupings of tiles into tile sets for which conformance point information is signaled must be identified in advance, and explicitly signaled for each identified combination. The bitrate overhead is high to signal for all possible combinations, especially when the number of tiles is large.

Some embodiments may provide technology to allow any combination of sub-pictures that form a rectangular region to be grouped into a sub-picture set, and the level indicator corresponding to any sub-picture to be derived based on the CVS level and the relative size of the coded picture and the sub-picture set. Advantageously, some embodiments may enable easier sub-bitstream extraction and bitstream merging, with clear interoperability and low bitrate overhead. For example, some embodiments may be useful for a variety of video coding standards, including the Versatile Video Coding (VVC) standard.

Some embodiment may include technology to support sequence level sub-pictures and sub-picture sets. Sub-pictures may correspond to a rectangular region, and are independently decodable for the entire sequence. Tile and slices may not cross sub-picture boundaries. Sub-picture sets can be derived based on any combination of sub-pictures that form a rectangular region, and are determined by external means. Sub-picture parameters are signaled in the sequence parameter set (SPS), using a grid to indicate the sub-picture size and position. Some embodiments may include an SPS flag to indicate that the level for any sub-picture or sub-picture set can be derived based on scaling of the picture size relative to the sub-picture or sub-picture set sample size, respectively. An SEI message may alternatively be used to signal additional tier and level information for sub-pictures or sub-picture sets. A fixed length sub_pic_id syntax element is signaled early in the slice header.

Example Sub-Picture Definition

A sub-picture may correspond to a rectangular region of a coded picture. Sub-picture sizes may vary within a picture. Each particular sub-picture size and position is consistent for all pictures in the sequence.

Each sub-picture sequence may be independent decodable. Tiles and slices may not span across sub-picture boundaries. The encoder may guarantee that each sub-picture is independently decodable. Semantic constraints on the bitstream may also be useful to impose this constraint.

Tile, slice, and brick arrangements within a sub-picture may vary for the pictures in a sequence.

Example Sub-Picture Signaling

Sub-picture parameters are signaled in the SPS. A sub-picture mapping is signaled to associate sample positions in the picture with a sub-picture ID, based on a grid. The grid granularity is selected by the encoder and explicitly signaled, for the horizontal and vertical dimensions. Syntax in the SPS indicates the sub_pic_id for each grid position, similar to the signaling mechanism proposed in JVET-N0275 for signaling of sections of a picture.

Figure 1B:
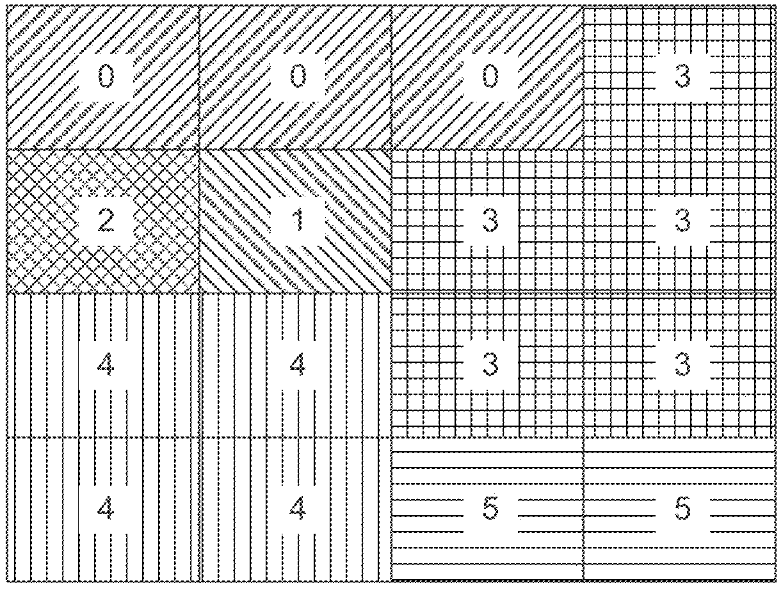
FIG. 1B is an illustrative diagram of an example of invalid sub-picture grid values according to an embodiment.

The coded picture is split into a grid, determined by the signaled number of horizontal and vertical grid elements that the picture is split into. For each (i, j)-th grid position, the sub_pic_id[i][j] is signaled. There are no restrictions on the ordering of sub_pic_id values. However, a sub-picture must be a contiguous rectangle, so all grid samples with a particular sub_pic_id value must be contiguous and in a rectangle shape. For example, FIG. 1A shows a valid example of the sub_pic_id values of a grid. FIG. 1B shows an invalid example, because sub-picture 3 is not rectangle shaped.

The encoder may determine the grid element size. Using a finer grid granularity requires more signaling overhead, but offers more flexibility for varying the size of sub-pictures. In some embodiments of the syntax, the granularity is 4×4, although other options are possible, including the min coding tree block (CTB) size. The total overhead for sub-picture parameter signaling increases with the number of sub-pictures.

An advantage of the grid signaling approach is that it is very easy to change the sub-picture id assignment in a coded bitstream, e.g. for a merging or splitting process.

Some embodiments may utilize conventional tile signaling, which may be done in the picture parameter set (PPS). It may be beneficial to revise the tile parameter signaling based on the sub-picture parameters present in the SPS, but this may violate the restriction on independent parsing of parameter sets.

Several syntax element types in the SPS are converted to fixed length codes in some embodiments, to enable easier access to the sub-picture parameters in the SPS.

In some embodiments of the syntax, the number of sub-pictures is limited to 256, with the highest value reserved to enable an extension if support for more sub-pictures is desired.

Example Slice Header Signaling

Some embodiments may include a slice_sub_pic_id syntax element at the start of slice header, immediately following the slice PPS. The slice PPS may be changed to be a fixed bit width field to enable easy access and/or modification to the slice_sub_pic_id syntax element.

In some embodiments, the signaling and/or calculation of the slice_address or brick parameters may be modified to be based on the values of sub_pic_id[i][j], SubPic Top[slice_sub_pic_id] and SubPicLeft[slice_sub_pic_id].

Example Sub-Picture Sets

Sub-picture sets may be made up of one or more sub-pictures. Sub-picture set parameters are not explicitly signaled within the SPS, but can be derived based on any combination of sub-pictures that form a rectangular region. External means may be used to determine which sub-pictures are in the sub-picture set that a decoder is expected to decode.

Figure 2A:
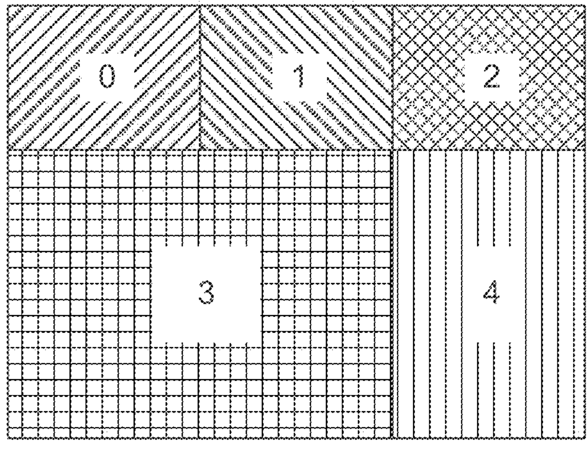
FIG. 2A is an illustrative diagram of an example of a picture organized as sub-pictures according to an embodiment.
Figure 2B:
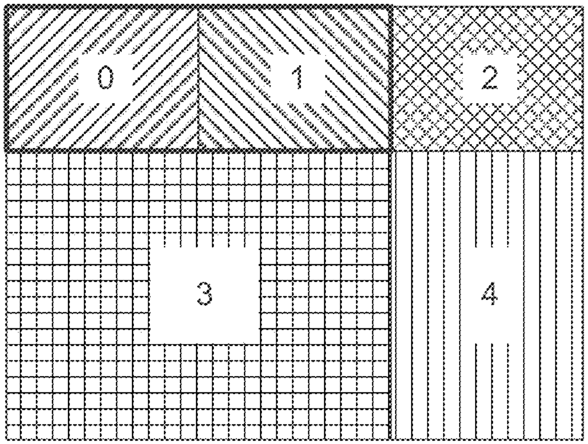
FIG. 2B is an illustrative diagram of an example of a picture organized as sub-pictures and a set of sub-pictures according to an embodiment.
Figure 2C:
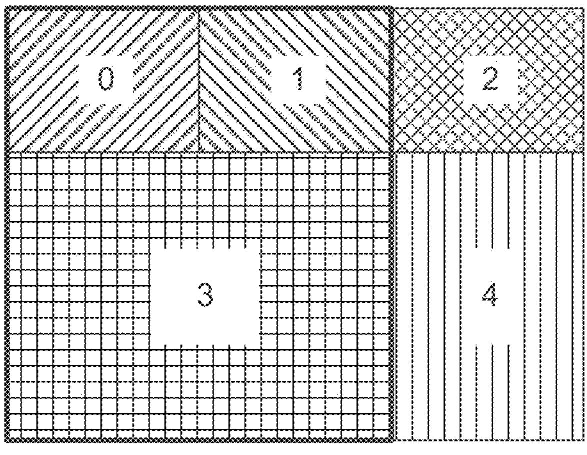
FIG. 2C is an illustrative diagram of an example of a picture organized as sub-pictures and another set of sub-pictures according to an embodiment.
Figure 2D:
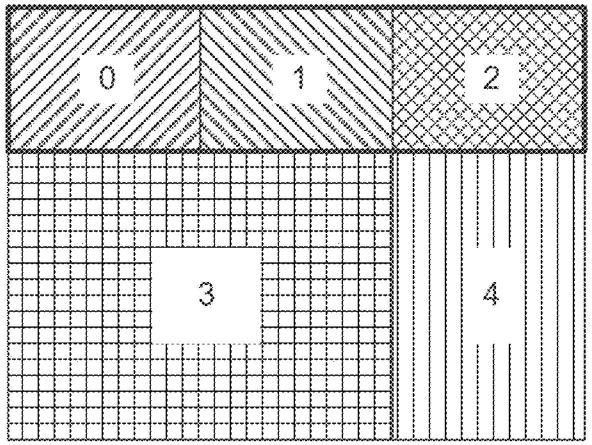
FIG. 2D is an illustrative diagram of an example of a picture organized as sub-pictures and another set of sub-pictures according to an embodiment.

FIG. 2A shows a picture split into several sub-pictures. FIGS. 2B, 2C, and 2D show examples of different sub-picture sets that could be formed from those sub-pictures, with the heavier outline indicating the respective set of sub-pictures (e.g., a set of sub-pictures 0 and 1 in FIG. 2B; a set of sub-pictures 0, 1, and 3 in FIG. 2C; and a set of sub-pictures 0, 1, and 2 in FIG. 2D).

An example usage is for 360 video coding using cube maps. For example, each of the 6 cube faces can be split into 4 regions, to make 24 sub-pictures. A decoder can select to decode and render only the sub-picture set containing the sub-pictures corresponding to the region that is being viewed.

Example Profile, Tier, Level for Sub-Picture Sequences and Sub-Picture Set Sequences All sub-picture sequences and sub-picture set sequences conform to the same profile as the CVS. Some embodiments may include an SPS flag to indicate that the level for all sub-picture sequences and sub-picture set sequences for the CVS can be derived based on ratio of the sub-picture or sub-picture set size, respectively, relative to the coded picture size. When this flag is set, the same tier is used for the sub-picture sequence and sub-picture set sequence as for the CVS.

The encoder may ensure that all sub-pictures and all possible sub-picture set sequences conform to the derived tier and level when the flag is set, including all restrictions on bitrate, sample rate, etc.

Example SEI Message for Explicit Profile, Tier, Level Signaling for Sub-Picture Sequences and Sub-Picture Set Sequences If additional level signaling is desired, some embodiment may utilize an SEI message which enables signaling of tier and level for any desired sub-pictures and sub picture sets. Embodiments of the syntax may differ from that used in the HEVC temporal motion-constrained tile sets SEI message. Advantageously, embodiments of the syntax is more easily modifiable when merged bitstreams are formed.

Example Sequence Parameter Set Syntax

| seq_parameter_set_rbsp( ) { | Descriptor |
|---|---|
| sps_decoding_parameter_set_id | u(4) |
| sps_video_parameter_set_id | u(4) |
| sps_max_sub_layers_minus1 | u(3) |
| sps_reserved_zero_5bits | u(5) |
| profile_tier_level( sps_max_sub_layers_minus1 ) | |
| gra_enabled_flag | u(1) |
| sps_seq_parameter_set_id | u(4) |
| chroma_format_idc | u(3) |
| if( chroma_format_idc = = 3 ) | |
| separate_colour_plane_flag | u(1) |
| pic_width_in_luma_samples | u(16) |
| pic_height_in_luma_samples | u(16) |
| sub_pics_present_flag | u(1) |
| if( sub_pics_present flag ) { | |
| sub_pic_derive_tier_level_flag | u(1) |
| max_sub_pics_minus1 | u(8) |
| sub_pic_grid_element_width_minus1 | u(v) |
| sub_pic_grid_element_height_minus1 | u(v) |
| SubPicGridCols = pic_width_in_luma_samples + sub_pic_grid_element_width_minus1* 4 + 3) / (sub_pic_grid_element_width_minus1* 4 + 4) | |
| SubPicGridRows = pic_height_in_luma_samples + sub_pic_grid_element_height_minus1 * 4 + 3) / (sub_pic_grid_element_height_minus1*4 + 4 ) | |
| for( i = 0; i < SubPicGridHeight; i++ ) { | |
| for( j = 0; j < SubPicGridWidth; j++) { | |
| sub_pic_id[ i ][ j ] | u(v) |
| conformance_window_flag | u(1) |
| if( conformance_window_flag ) { | |
| conf_win_left_offset | ue(v) |
| conf_win_right_offset | ue(v) |
| conf_win_top_offset | ue(v) |
| conf_win_bottom_offset | ue(v) |
| } | |

sub_pics_present_flag equal to 1 indicates that sub-picture parameters are present in the syntax structure. sub_pics_present_flag equal to 0 indicates that sub-picture parameters are not present in the syntax structure.

sub_pic_derive_tier_level_flag equal to 1 indicates that the tier and level indicators of all sub-pictures and sub-picture sets in the CVS can be derived.

max_sub_pics_minus1 plus 1 specifies the maximum number of sub-pictures that may be present in the CVS. max_sub_pics_minus1 shall be in the range of 0 to 254. The value of 255 may be reserved for future use.

sub_pic_grid_element_width_minus1 specifies the width of each element of the sub-picture identifier grid in units of 8 samples. The length of the syntax element is Ceil (Log2 (PicWidthInMinCbsY)) bits.

sub_pic_grid_element_height_minus1 specifies the width of each element of the sub-picture identifier grid in units of 8 samples. The length of the syntax element is Ceil (Log2 (PicHeightInMinCbsY)) bits.

sub_pic_id[i][j] specifies the sub-picture identifier of the (i, j)-th grid position. The length of the syntax element is Ceil (Log2(max_sub_pics_minus1+1)) bits.

```
It is a requirement of bitstream conformance that
if (i > 0 && j > 0)
   if (sub_pic_id[ i ][ j ] == sub_pic_id[ i -1][ j ] && (sub_pic_id[ i ][ j ] ==
sub_pic_id[ i ][ j - 1])
   sub_pic_id[ i ][ j ] shall equal sub_pic_id[ i - 1][ j -1]
The variables SubPicTop[ i [ j ]], SubPicLeft[ i ][ j ], are derived as follows.
if (i == 0)
   SubPicTop[sub_pic_id[ i ][ j ] = 0
else if (sub_pic_id[ i ][ j ] != sub_pic_id[ i - 1][ j ])
   SubPicTop[sub_pic_id[ i ][ j ]] = i
if (j == 0)
   SubPicLeft[sub_pic_id[ i ][ j ]] = 0
else if (sub_pic_id[ i ][ j ] != sub_pic_id[ i ][ j - 1 ])
   SubPicLeft[sub_pic_id[ i ][ j ]] = j
```

Example Slice Header

| slice header( ) { | Descriptor |
|---|---|
| slice_pic_parameter_set_id | u(5) |
| if( sub_pics_present_flag ) | |

-continued

Example Slice Header

| slice header( ) { | Descriptor |
|---|---|
| slice_sub_pic_id | u(v) |
| if( rect_slice_flag \| \| NumBricksInPic > 1 ) | |
| slice_address | u(v) |
| if( !rect_slice_flag && !single_brick_per_slice_flag ) | |
| num_bricks_in_slice_minus1 | ue(v) |
| slice_type | ue(v) |
| ... | |

slice_sub_pic_id specifies the sub-picture identifier of the slice. The length of the syntax element is Ceil (Log2 (max_sub_pics_minus1+1)) bits.

Example SEI Message

| sub_picture_ptl( ) { | Descriptor |
|---|---|
| sp_id_len | u(3) |
| sp_tier_present_flag | u(1) |
| num_sub_pic_params_minus1 | u(8) |
| for (i = 0; i <= num_sub_pics_params_minus1; i++) { | |
| sp_sub_pic_id | u(v) |
| if ( sp_tier_present_flag) | |
| sp_tier_idc[sp_sub_pic_id] | u(1) |
| sp_level_idc[sp_sub_pic_id] | u(8) |
| } | |
| num_sub_pic_sets_params | u(8) |
| for (i = 0; i < num_sub_pic_sets_params; i++) { | |
| sp_sub_pic_set_id | u(8) |
| for (j = 0; i < sp_max_sub_pics_minus1; i++) | |
| sp_sub_pic_id_in_set[sp_sub_pic_set_id][ j ] | u(8) |
| sp_set_level_idc[sp_sub_pic_set_id] | u(v) |
| if( sp_tier_present_flag) | u(8) |
| sp_set_tier_idc[sp_sub_pic_set id] | u(v) |
| } | |
| } | |

sp_id_len specifies the number of bits used to signal the sp_sub_ic_id syntax element.

sp_tier_present_flag equal to 1 specifies that the sp_tier_idc[sp_sub_pic_id] and sp_set_tier_idc[sp_sub_pic_ set_id] syntax elements are present in the syntax structure. sp_tier_present_flag equal to 0 specifies that the sp_tier_idc[sp_sub_pic_id] and sp_set_tier_idc[sp_sub_pic_set_id] syntax elements are not present in the syntax structure.

num_sub_pic_params_minus1+1 specifies the number of sub-pictures for which parameters are present in the syntax structure.

sp_sub_pic_id specifies the identifier of the sub-picture for the signaled parameters.

sp_tier_idc[sp_sub_pic_id] specifies a level context for the interpretation of level context for the interpretation of sp_level_idc[sp_sub_pic_id]. When not present, the value of sp_tier_idc[sp_sub_pic_id] is inferred to be equal to tier_idc for the active SPS.

sp_level_idc[sp_sub_pic_id] indicates a level to which the sp_sub_pic_id-th sub-bitstream sequence conforms. When not present, the value of sp_level_idc[sp_sub_pic_id] is inferred to be equal to level_idc for the active SPS.

num_sub_pic_sets_params specifies the number of sub-picture sets for which parameters are present in the syntax structure.

sp_sub_pic_set_id specifies the identifier of the sub-picture set for the signaled parameters.

sp_sub_pic_id_in_set[sp_sub_pic_set_id][j] equal to 1 specifies that the j-th sub-picture is included in the sp_sub_pic_set_id-th sub-picture set. sp_sub_pic_id_in_set[sp_sub_ pic_set_id][j] equal to 0 specifies that the j-th sub-picture is not included in the sp-sub_pic_set_id-th sub-picture set.

sp_set_tier_idc[sp_sub_pic_set_id] specifies a level context for the interpretation of level context for the interpretation of sp_level_idc[sp_sub_pic_id]. When not present, the value of sp_tier_idc[sp_sub_pic_set_id] is inferred to be equal to tier_idc for the active SPS.

sp_set_level_idc[sp_sub_pic_set_id] indicates a level to which the sp_sub_pic_id-th sub-bitstream sequence conforms. When not present, the value of sp_set_level_idc [sp_sub_pic_set_id] is inferred to be equal to level_idc for the active SPS.

Example Sub-Picture Extraction Process

External means are expected to provide a list of the sub-picture ID values included in the sub-picture set, applicable for the entire CVS, which is used in the sub-picture extraction process. The sub-picture set must form a rectangle.

The sub-bitstream extraction process discards all NAL units that are not in the list of the sub-picture ID values included in the sub-picture set.

The sub-picture set extraction process imposes constraints that the extracted sub-picture set sequence is a valid decodable bitstream.

In an alternative embodiment, sub-picture sets are not required to be rectangular shaped.

Example Level Derivation

Some embodiments may derive a level value for sub-picture sets (e.g., based on the level limits of HEVC Annex A). In HEVC Annex A, for example, the general_level_idc syntax element value is 30*the Level value indicated in table A.6.

The level for an individual sub-picture is derived by deriving the level for a sub-picture set containing only the individual sub-picture.

The derivation is based on scaling the max luma sample rate for the CVS's level_idc by the ratio of the sub-picture set size to the picture size. It is based on the assumption that the frame rate for the sub-pictures in the sequence is the same as for the pictures in the sequence.

The level limits on CVSes, including bitrate limits, also apply those restrictions to extracted sub-picture set sequences. It is the encoder's responsibility to ensure that those constraints are obeyed by all sub-pictures and all possible sub-picture sets.

The set of sub-pictures included in the sub-picture set is provided via external means.

The size of the n-th sub-picture in units of grid samples, SubPicNumGridSamples[n], for n in 0 . . . max_sub_pics_minus1, is derived as follows.

```
SubPicNumGridSamples[ n ] = 0
for (i = 0; i < SubPicGridRows; i ++)
  for (j = 0; i < SubPicGridCols; j ++)
    if (n = sub_pic_id[ i ][ j ])
      SubPicNumGridSamples[ n ]++
```

The size of the sub-picture set in units of grid samples, SubPicSetNumGridSamples, is derived as follows.

```
SubPicSetNumGridSamples = 0
  for (n = 0; n <= max_sub_pics_minus1; n++)
    if (sub-picture n is in the sub-picture set)
```

-continued

```
        SubPicSetNumGridSamples += SubPicNumGridSamples[ n
]
```

The size of the sub-picture set in units of luma samples, SubPicSetSizeY, is set equal to SubPic SetNumGridSamples*(sub_pic_grid_element_width_minus1*4+1)*(sub_pic_grid_element_height_minus*4+1)

The values of MaxLumarSr[LevelIdcl] and MaxLumaSr [LevelIdc] are taken from Table A.X. For values of LevelIdc not in Table A.X, MaxLumaPs[LevelIdc]=0 and MaxLumaSr LevelIdc]=0. Column A corresponds to "Level;" Column B corresponds to "Level Idc;" Column C corresponds to "Max luma picture size MaxLumaPs[LevelIdc] (samples);" and Column D corresponds to "Max luma sample rate MaxLumaSr LevelIdc] (samples/sec)."

TABLE A.X

| Level limits | | | |
|---|---|---|---|
| A | B | C | D |
| 1 | 30 | 36 864 | 552 960 |
| 2 | 60 | 122 880 | 3 686 400 |
| 2.1 | 63 | 245 760 | 7 372 800 |
| 3 | 90 | 552 960 | 16 588 800 |
| 3.1 | 93 | 983 040 | 33 177 600 |
| 4 | 120 | 2 228 224 | 66 846 720 |
| 4.1 | 123 | 2 228 224 | 133 693 440 |
| 5 | 150 | 8 912 896 | 267 386 880 |
| 5.1 | 153 | 8 912 896 | 534 773 760 |
| 5.2 | 156 | 8 912 896 | 1 069 547 520 |
| 6 | 180 | 35 651 584 | 1 069 547 520 |
| 6.1 | 183 | 35 651 584 | 2 139 095 040 |
| 6.2 | 186 | 35 651 584 | 4 278 190 080 |

The value of of sub-picture set sequence level indicator, SubPicSetLevelIdc, is derived as follows.

```
  SubPicSetLevelIdc = level_idc
  for (k = level_idc; k > 0; k -- )
    if ( SubPicSetSize Y <= MaxLumaPs[ k ] &&
          MaxLumaSr[ level_idc ]*SubPicSetSize Y/ PicSizeInSamplesY
<=
MaxLumaSr[ k ] )
        SubPicSetLevelIdc = k
```

In an alternative embodiment, sub-picture sets are not required to be rectangular in shape. Instead, the derive level for the sub-picture set is based on the size in samples of the bounding rectangle containing the sub-picture set, rather than the size in samples of the sub-picture set itself.

Various components of the systems described herein may be implemented in software, firmware, and/or hardware and/or any combination thereof. For example, various components of the systems or devices discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 3:
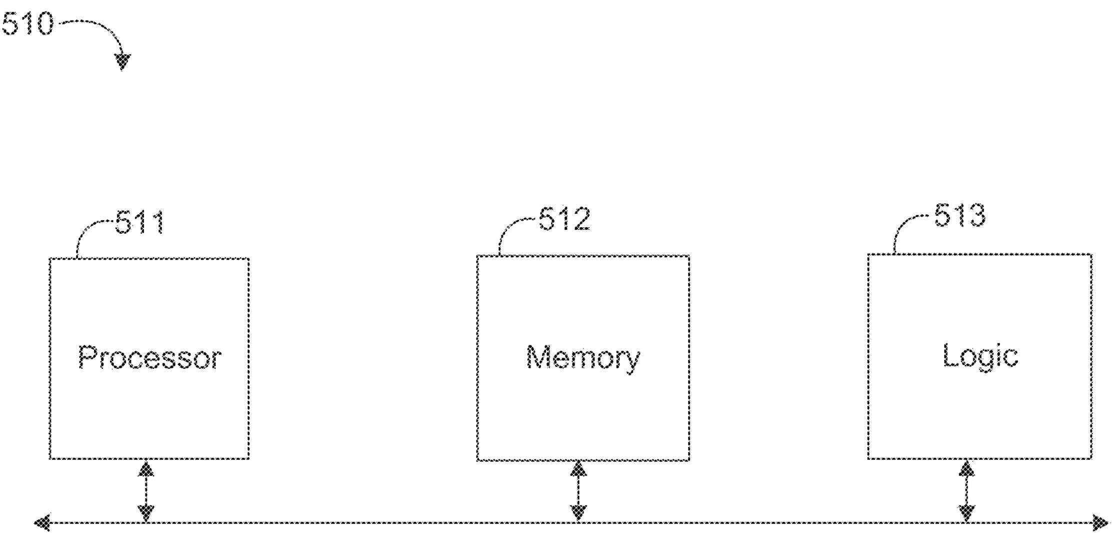
FIG. 3 is a block diagram of an example of an electronic system according to an embodiment.

With reference to FIG. 3, an embodiment of an electronic system 510 may include memory 512 to store video data, a processor 511 coupled to the memory 512, and logic 513 coupled to the processor 511 and the memory 512. The logic 513 may be configured to derive a conformance point for a sub-region of coded pictures in a coded video sequence in the video data. For example, the logic 513 may be configured to group a combination of one or more sub-pictures that form a rectangular region in the video data into a sub-picture set, and/or to derive a level indicator corresponding to a sub-picture based on a level of the coded video sequence and a relative size of a coded picture and the sub-picture set. The logic 513 may also be configured to implement one or more aspects of the sequence parameter set syntax described herein, to implement one or more aspects of the signaling described herein, and/or to implement one or more aspects of the sub-picture extraction and level derivation described herein. In some embodiments, the logic 513 may be configured to signal one or more of tier and level information for one or more of a sub-picture and a sub-picture set with a message in the video data. In some embodiments, the logic 513 may be configured to signal a sub-picture parameter in a parameter set, and indicate a size and position of the sub-picture based on a grid. The logic 513 may also be configured to provide an indication in a message in the video data that the level for any sub-picture or sub-picture set is to be derived based on scaling of the picture size relative to one of the sub-picture and a sub-picture set sample size. In any of the embodiments herein, the logic 513 may be further configured to provide a VVC codec to utilize sub-pictures and sets of sub-pictures to one or more of encode and decode the video data.

Embodiments of each of the above processor 511, memory 512, logic 513, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the processor 511 may include a general purpose processor, a special purpose processor, a central processor unit (CPU), a graphic processor, a general purpose controller, an execution unit, a special purpose controller, a general purpose controller, a micro-controller, etc. In some embodiments, the logic 513, may be located in, or co-located with, various components, including the processor 511 (e.g., on a same die).

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the “C” programming language or similar programming languages. For example, the memory 512, firmware memory, persistent storage media, or other system memory may store a set of instructions which when executed by the processor 511 cause the system 510 to implement one or more components, features, or aspects of the system 510 (e.g., the logic 513, grouping the sub-pictures into sub-picture sets, deriving the level indicators, etc.).

Figure 4:
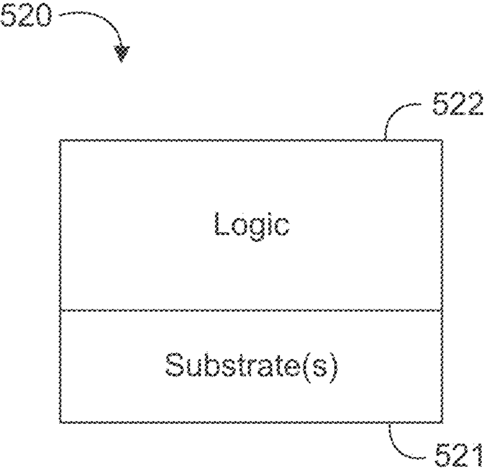
FIG. 4 is a block diagram of an example of an electronic apparatus according to an embodiment.

Turning now to FIG. 4, an embodiment of a video codec apparatus 520 may include one or more substrates 521, and logic 522 coupled to the one or more substrates 521. The logic 522 may be configured to derive a conformance point for a sub-region of coded pictures in a coded video sequence in video data. For example, the logic 522 may be configured to group any combination of sub-pictures that form a rectangular region into a sub-picture set, and/or to derive a level indicator corresponding to a sub-picture based on a level of the coded video sequence and a relative size of the coded picture and the sub-picture set. The logic 522 may also be configured to implement one or more aspects of the sequence parameter set syntax described herein, to implement one or more aspects of the signaling described herein, and/or to implement one or more aspects of the sub-picture extraction and level derivation described herein. In some embodiments, the logic 522 may be configured to signal one or more of tier and level information for one or more of a sub-picture and a sub-picture set with a message in the video data. In some embodiments, the logic 522 may be configured to signal a sub-picture parameter in a parameter set, and indicate a size and position of the sub-picture based on a grid. The logic 522 may also be configured to provide an indication in a message in the video data that the level for any sub-picture or sub-picture set is to be derived based on scaling of the picture size relative to one of the sub-picture and a sub-picture set sample size. In any of the embodiments herein, the logic 522 may be further configured to provide a VVC codec to utilize sub-pictures and sets of sub-pictures to one or more of encode and decode the video data.

Some embodiments of the logic 522 may be additionally or alternatively configured with complementary decode logic. For example, the logic 522 may be configured to receive a bitstream of video data, identify a sub-picture set to be decoded that corresponds to a group of one or more sub-pictures, derive a sub-picture set level based on size of the identified sub-picture set, and determine if the derived level is equal or lower than a threshold level decode. The group of one or more sub-pictures may form a rectangular region in the video data. In some embodiments, the logic 522 may be further configured to decode one or more of tier and level information for the sub-picture set based on a message in the video data. In some embodiments, the logic 522 may be further configured to determine a sub-picture parameter from a parameter set in the video data, and determine a size and position of a sub-picture based on a grid. For example, the logic 522 may be configured to determine, based on an indication provided in a message in the video data, that the level for any sub-picture or sub-picture set is to be derived based on scaling of the picture size relative to one of the sub-picture and a sub-picture set sample size.

For example, the logic 522 may be implemented on a semiconductor apparatus which may include the one or more substrates 521, with the logic 522 coupled to the one or more substrates 521. In some embodiments, the logic 522 may be at least partly implemented in one or more of configurable logic and fixed-functionality hardware logic on semiconductor substrate(s) 521 (e.g., silicon, sapphire, gallium-arsenide, etc.). For example, the logic 522 may include a transistor array and/or other integrated circuit components coupled to the substrate(s) 521 with transistor channel regions that are positioned within the substrate(s) 521. The interface between the logic 522 and the substrate(s) 521 may not be an abrupt junction. The logic 522 may also be considered to include an epitaxial layer that is grown on an initial wafer of the substrate(s) 521.

Figure 5:
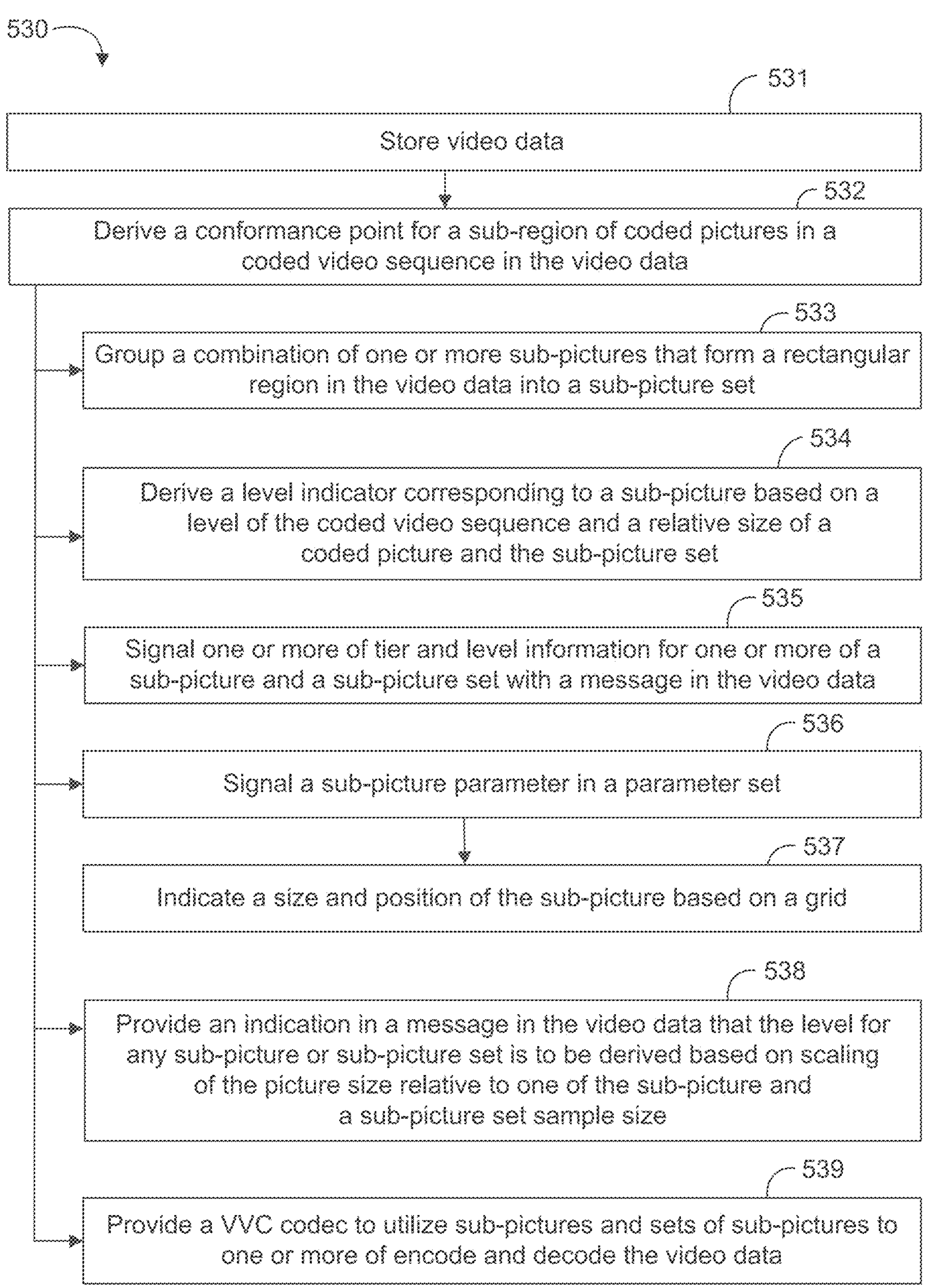
FIG. 5 is a flowchart of an example of a method of processing video data according to an embodiment.

With reference to FIG. 5, an embodiment of a method 530 of processing video data may include comprising storing video data at block 531, and deriving a conformance point for a sub-region of coded pictures in a coded video sequence in the video data at block 532. For example, the method 530 may include grouping a combination of one or more sub-pictures that form a rectangular region in the video data into a sub-picture set at block 533, and/or deriving a level indicator corresponding to a sub-picture based on a level of the coded video sequence and a relative size of a coded picture and the sub-picture set at block 534. Some embodiments of the method 530 may further include signaling one or more of tier and level information for one or more of a sub-picture and a sub-picture set with a message in the video data at block 535. The method 530 may also include signaling a sub-picture parameter in a parameter set at block 536, and indicating a size and position of the sub-picture based on a grid at block 537. For example, the method 530 may further include providing an indication in a message in the video data that the level for any sub-picture or sub-picture set is to be derived based on scaling of the picture size relative to one of the sub-picture and a sub-picture set sample size at block 538. In any of the embodiments herein, the method 530 may further include providing a VVC codec to utilize sub-pictures and sets of sub-pictures to one or more of encode and decode the video data at block 539.

Embodiments of the method 530 may be implemented in a system, apparatus, computer, device, etc., for example, such as those described herein. More particularly, hardware implementations of the method 530 may include configurable logic such as, for example, PLAS, FPGAs, CPLDs, or in fixed-functionality logic hardware using circuit technology such as, for example, ASIC, CMOS, or TTL technology, or any combination thereof. Alternatively, or additionally, the method 530 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 530 may be implemented on a computer readable medium as described in connection with Examples 14 to 19 below. Embodiments or portions of the method 530 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Figure 6:
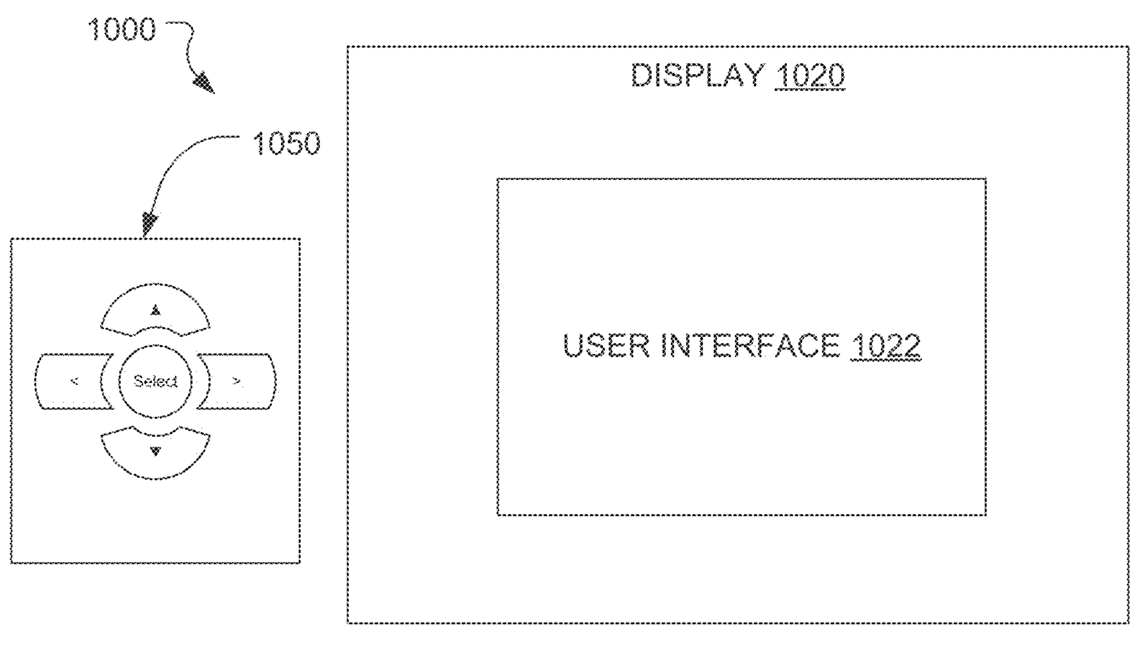
FIG. 6 is an illustrative diagram of an example system.
Figure 6:
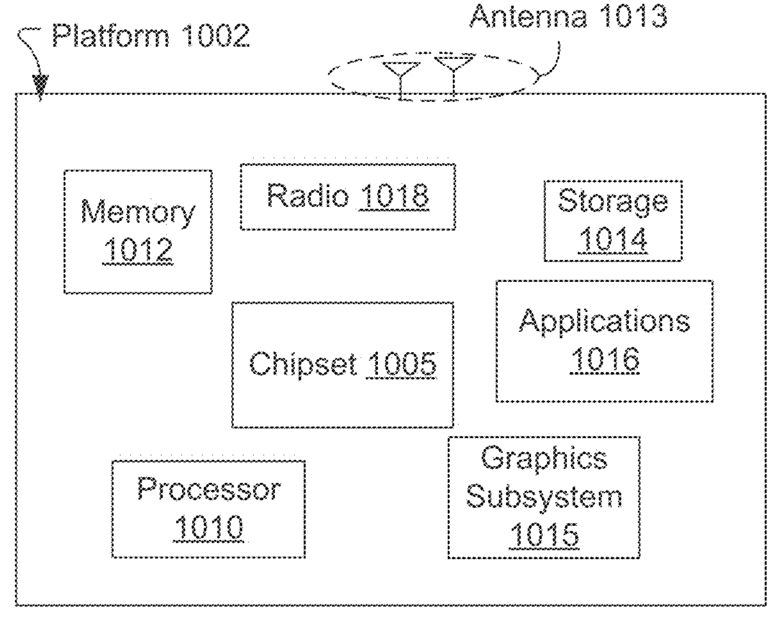
Figure 6:
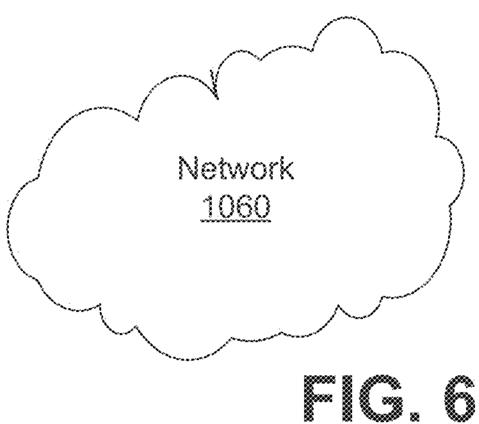

FIG. 6 is an illustrative diagram of an example system 1000, arranged in accordance with at least some implementations of the present disclosure. In various implementations, system 1000 may be a mobile system although system 1000 is not limited to this context. For example, system 1000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1000 includes a platform 1002 coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, antenna 1013, storage 1014, graphics subsystem 1015, applications 1016 and/or radio 1018. Chipset 1005 may provide intercommunication among processor 1010, memory 1012, storage 1014, graphics subsystem 1015, applications 1016 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, DisplayPort, wireless HDMI, and/or wireless HD compliant techniques. Graphics subsystem 1015 may be integrated into processor 1010 or chipset 1005. In some implementations, graphics subsystem 1015 may be a stand-alone device communicatively coupled to chipset 1005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of uni-directionally or bi-directionally communicating content between content providers and platform 1002 and/display 1020, via network 1060 or directly. It will be appreciated that the content may be communicated uni-directionally and/or bi-directionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of may be used to interact with user interface 1022, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 1020) by movements of a pointer, cursor, focus ring, or other visual indicators displayed on the display. For example, under the control of software applications 1016, the navigation features located on navigation may be mapped to virtual navigation features displayed on user interface 1022, for example. In various embodiments, may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various embodiments, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
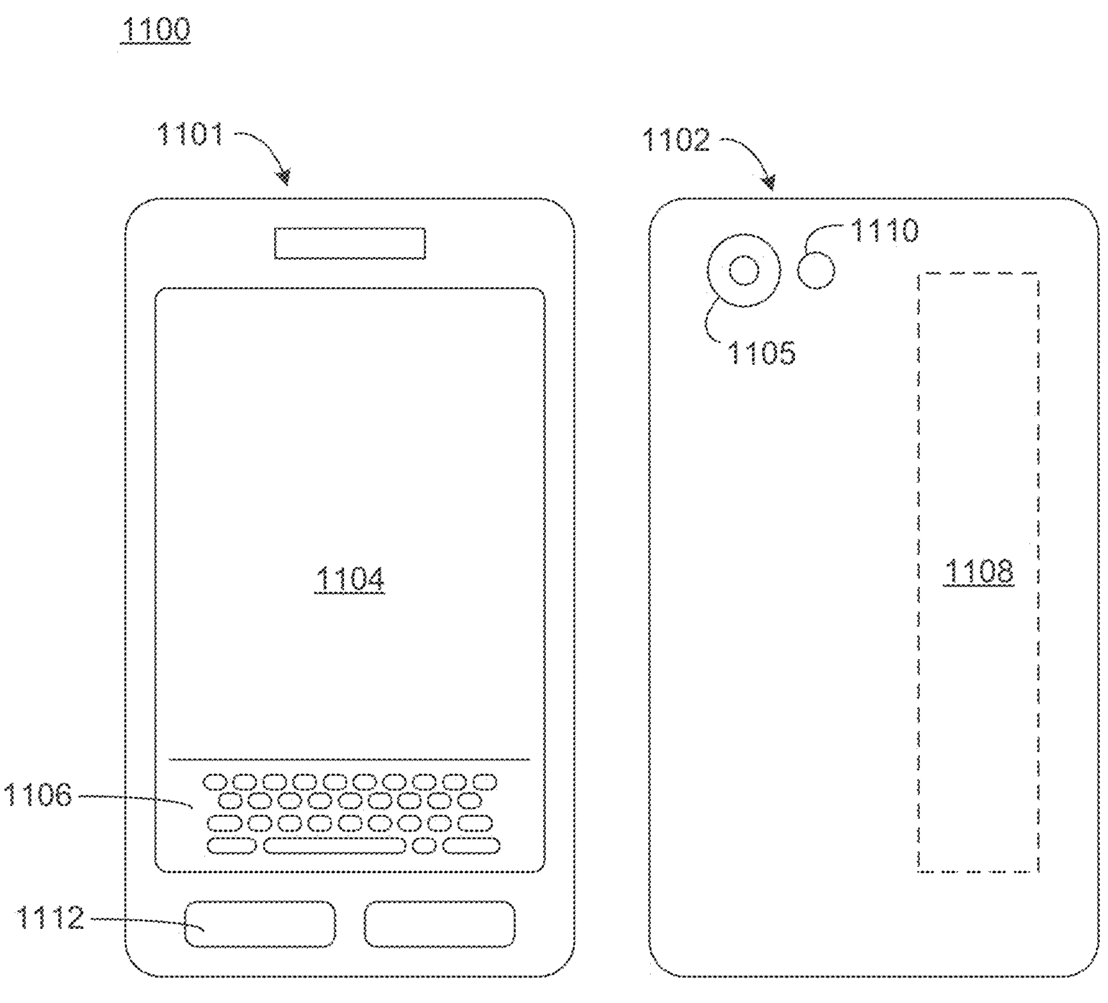
FIG. 7 illustrates an example small form factor device, all arranged in accordance with at least some implementations of the present disclosure.

As described above, system 1000 may be embodied in varying physical styles or form factors. FIG. 7 illustrates an example small form factor device 1100, arranged in accordance with at least some implementations of the present disclosure. In some examples, system 1000 may be implemented via device 1100. In other examples, system 100 or portions thereof may be implemented via device 1100. In various embodiments, for example, device 1100 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 1100 may include a housing with a front 1101 and a back 1102. Device 1100 includes a display 1104, an input/output (I/O) device 1106, and an integrated antenna 1108. Device 1100 also may include navigation features 1112. I/O device 1106 may include any suitable I/O device for entering information into a mobile computing device. Examples for I/O device 1106 may include an alphanumeric keyboard, a numeric keypad, a touch pad, input keys, buttons, switches, microphones, speakers, voice recognition device and software, and so forth. Information also may be entered into device 1100 by way of microphone (not shown), or may be digitized by a voice recognition device. As shown, device 1100 may include a camera 1105 (e.g., including a lens, an aperture, and an imaging sensor) and a flash 1110 integrated into back 1102 (or elsewhere) of device 1100. In other examples, camera 1105 and flash 1110 may be integrated into front 1101 of device 1100 or both front and back cameras may be provided. Camera 1105 and flash 1110 may be components of a camera module to originate image data processed into streaming video that is output to display 1104 and/or communicated remotely from device 1100 via antenna 1108 for example.

The system 1000 and/or the device 1100 may include one or more features or aspects of the various embodiments described herein, including those described in connection with deriving a conformance point for a sub-region of coded pictures in a coded video sequence in the video data, grouping any combination of sub-pictures that form a rectangular region into a sub-picture set, deriving a level indicator corresponding to a sub-picture based on a level of the coded video sequence and a relative size of the coded picture and the sub-picture set, the sequence parameter set syntax described herein, the signaling described herein, the sub-picture extraction and level derivation described herein, provide a VVC codec to utilize sub-pictures and sets of sub-pictures to one or more of encode and decode the video data, or any of the embodiments described herein.

ADDITIONAL NOTES AND EXAMPLES

Example 1 includes an electronic system, comprising memory to store video data, a processor coupled to the memory, and logic coupled to the processor and the memory, the logic to derive a conformance point for a sub-region of coded pictures in a coded video sequence in the video data.

Example 2 includes the system of Example 1, wherein the logic is further to group a combination of one or more sub-pictures that form a rectangular region in the video data into a sub-picture set.

Example 3 includes the system of Example 2, wherein the logic is further to derive a level indicator corresponding to a sub-picture based on a level of the coded video sequence and a relative size of a coded picture and the sub-picture set.

Example 4 includes the system of any of Examples 2 to 3, wherein the logic is further to signal one or more of tier and level information for one or more of a sub-picture and a sub-picture set with a message in the video data.

Example 5 includes the system of any of Examples 2 to 3, wherein the logic is further to signal a sub-picture parameter in a parameter set, and indicate a size and position of the sub-picture based on a grid.

Example 6 includes the system of Example 5, wherein the logic is further to provide an indication in a message in the video data that the level for any sub-picture or sub-picture set is to be derived based on scaling of the picture size relative to one of the sub-picture and a sub-picture set sample size.

Example 7 includes the system of any of Examples 1 to 6, wherein the logic is further to provide a Versatile Video Coding (VVC) codec to utilize sub-pictures and sets of sub-pictures to one or more of encode and decode the video data.

Example 8 includes a method of processing video data, comprising storing video data, and deriving a conformance point for a sub-region of coded pictures in a coded video sequence in the video data.

Example 9 includes the method of Example 8, further comprising grouping a combination of one or more sub-pictures that form a rectangular region in the video data into a sub-picture set.

Example 10 includes the method of Example 9, further comprising deriving a level indicator corresponding to a sub-picture based on a level of the coded video sequence and a relative size of a coded picture and the sub-picture set.

Example 11 includes the method of any of Examples 9 to 10, further comprising signaling one or more of tier and level information for one or more of a sub-picture and a sub-picture set with a message in the video data.

Example 12 includes the method of any of Examples 9 to 10, further comprising signaling a sub-picture parameter in a parameter set, and indicating a size and position of the sub-picture based on a grid.

Example 13 includes the method of Example 12, further comprising providing an indication in a message in the video data that the level for any sub-picture or sub-picture set is to be derived based on scaling of the picture size relative to one of the sub-picture and a sub-picture set sample size.

Example 14 includes at least one non-transitory machine readable medium comprising a plurality of instructions that, in response to being executed on a computing device, cause the computing device to store video data, and derive a conformance point for a sub-region of coded pictures in a coded video sequence in the video data.

Example 15 includes the at least one non-transitory machine readable medium of Example 14, comprising a plurality of further instructions that, in response to being executed on the computing device, cause the computing device to group a combination of one or more sub-pictures that form a rectangular region in the video data into a sub-picture set.

Example 16 includes the at least one non-transitory machine readable medium of Example 15, comprising a plurality of further instructions that, in response to being executed on the computing device, cause the computing device to derive a level indicator corresponding to a sub-picture based on a level of the coded video sequence and a relative size of a coded picture and the sub-picture set.

Example 17 includes the at least one non-transitory machine readable medium of any of Examples 15 to 16, comprising a plurality of further instructions that, in response to being executed on the computing device, cause the computing device to signal one or more of tier and level information for one or more of a sub-picture and a sub-picture set with a message in the video data.

Example 18 includes the at least one non-transitory machine readable medium of any of Examples 15 to 16, comprising a plurality of further instructions that, in response to being executed on the computing device, cause the computing device to signal a sub-picture parameter in a parameter set, and indicate a size and position of the sub-picture based on a grid.

Example 19 includes the at least one non-transitory machine readable medium of Example 18, comprising a plurality of further instructions that, in response to being executed on the computing device, cause the computing device to providing an indication in a message in the video data that the level for any sub-picture or sub-picture set is to be derived based on scaling of the picture size relative to one of the sub-picture and a sub-picture set sample size.

Example 20 includes an electronic apparatus, comprising one or more substrates, and logic coupled to the one or more substrates, the logic to derive a conformance point for a sub-region of coded pictures in a coded video sequence in video data.

Example 21 includes the apparatus of Example 20, wherein the logic is further to group a combination of one or more sub-pictures that form a rectangular region in the video data into a sub-picture set.

Example 22 includes the apparatus of Example 21, wherein the logic is further to derive a level indicator corresponding to a sub-picture based on a level of the coded video sequence and a relative size of a coded picture and the sub-picture set.

Example 23 includes the apparatus of any of Examples 21 to 22, wherein the logic is further to signal one or more of tier and level information for one or more of a sub-picture and a sub-picture set with a message in the video data.

Example 24 includes the apparatus of any of Examples 21 to 22 wherein the logic is further to signal a sub-picture parameter in a parameter set, and indicate a size and position of the sub-picture based on a grid.

Example 25 includes the apparatus of Example 24, wherein the logic is further to provide an indication in a message in the video data that the level for any sub-picture or sub-picture set is to be derived based on scaling of the picture size relative to one of the sub-picture and a sub-picture set sample size.

Example 26 includes the apparatus of any of Examples 20 to 25, wherein the logic is further to provide a VVC codec to utilize sub-pictures and sets of sub-pictures to one or more of encode and decode the video data.

Example 27 includes a video code apparatus, comprising means for storing video data, and means for deriving a conformance point for a sub-region of coded pictures in a coded video sequence in the video data.

Example 28 includes the apparatus of Example 27, further comprising means for grouping a combination of one or more sub-pictures that form a rectangular region in the video data into a sub-picture set.

Example 29 includes the apparatus of Example 28, further comprising means for deriving a level indicator corresponding to a sub-picture based on a level of the coded video sequence and a relative size of a coded picture and the sub-picture set.

Example 30 includes the apparatus of any of Examples 28 to 29, further comprising means for signaling one or more of tier and level information for one or more of a sub-picture and a sub-picture set with a message in the video data.

Example 31 includes the apparatus of any of Examples 28 to 29, further comprising means for signaling a sub-picture parameter in a parameter set, and means for indicating a size and position of the sub-picture based on a grid.

Example 32 includes the apparatus of Example 31, further comprising means for providing an indication in a message in the video data that the level for any sub-picture or sub-picture set is to be derived based on scaling of the picture size relative to one of the sub-picture and a sub-picture set sample size.

Example 33 includes the apparatus of any of Examples 27 to 32, further comprising means for providing a VVC codec to utilize sub-pictures and sets of sub-pictures to one or more of encode and decode the video data.

Example 34 includes an electronic system, comprising memory to store video data, a processor coupled to the memory, and logic coupled to the processor and the memory, the logic to derive a conformance point for a sub-region of coded pictures in a coded video sequence in the video data, and group any combination of sub-pictures that form a rectangular region into a sub-picture set.

Example 35 includes the system of Example 34, wherein the logic is further to derive a level indicator corresponding to a sub-picture based on a level of the coded video sequence and a relative size of the coded picture and the sub-picture set.

Example 36 includes the system of any of Examples 34 to 35, wherein the logic is further to implement one or more aspects of the sequence parameter set syntax described herein.

Example 37 includes the system of any of Examples 34 to 36, wherein the logic is further to implement one or more aspects of the signaling described herein.

Example 38 includes the system of any of Examples 34 to 37, wherein the logic is further to implement one or more aspects of the sub-picture extraction and level derivation described herein.

Example 39 includes the system of any of Examples 34 to 38, wherein the logic is further to provide a VVC codec to utilize sub-pictures and sets of sub-pictures to one or more of encode and decode the video data.

Example 40 includes a method of encoding/decoding video data, comprising storing video data, deriving a conformance point for a sub-region of coded pictures in a coded video sequence in the video data, and grouping any combination of sub-pictures that form a rectangular region into a sub-picture set.

Example 41 includes the method of Example 40, further comprising deriving a level indicator corresponding to a sub-picture based on a level of the coded video sequence and a relative size of the coded picture and the sub-picture set.

Example 42 includes the method of any of Examples 40 to 41, further comprising implementing one or more aspects of the sequence parameter set syntax described herein.

Example 43 includes the method of any of Examples 40 to 42, further comprising implementing one or more aspects of the signaling described herein.

Example 44 includes the method of any of Examples 40 to 43, further comprising implementing one or more aspects of the sub-picture extraction and level derivation described herein.

Example 45 includes the method of any of Examples 40 to 44, further comprising providing a VVC codec to utilize sub-pictures and sets of sub-pictures to one or more of encode and decode the video data.

Example 46 includes at least one non-transitory machine readable medium comprising a plurality of instructions that, in response to being executed on a computing device, cause the computing device to derive a conformance point for a sub-region of coded pictures in a coded video sequence in video data, and group any combination of sub-pictures that form a rectangular region into a sub-picture set.

Example 47 includes the machine readable medium of Example 46, comprising a plurality of further instructions that, in response to being executed on the computing device, cause the computing device to derive a level indicator corresponding to a sub-picture based on a level of the coded video sequence and a relative size of the coded picture and the sub-picture set.

Example 48 includes the machine readable medium of any of Examples 46 to 47, comprising a plurality of further instructions that, in response to being executed on the computing device, cause the computing device to implement one or more aspects of the sequence parameter set syntax described herein.

Example 49 includes the machine readable medium of any of Examples 46 to 48, comprising a plurality of further instructions that, in response to being executed on the computing device, cause the computing device to implement one or more aspects of the signaling described herein.

Example 50 includes the machine readable medium of any of Examples 46 to 49, comprising a plurality of further instructions that, in response to being executed on the computing device, cause the computing device to implement one or more aspects of the sub-picture extraction and level derivation described herein.

Example 51 includes the machine readable medium of any of Examples 46 to 50, comprising a plurality of further instructions that, in response to being executed on the computing device, cause the computing device to provide a VVC codec to utilize sub-pictures and sets of sub-pictures to one or more of encode and decode the video data.

Example 52 includes an electronic apparatus, comprising one or more substrates, and logic coupled to the one or more substrates, the logic to receive a bitstream of video data, identify a sub-picture set to be decoded that corresponds to a group of one or more sub-pictures, derive a sub-picture set level based on size of the identified sub-picture set, and determine if the derived level is equal or lower than a threshold level decode.

Example 53 includes the apparatus of Example 52, wherein the group of one or more sub-pictures form a rectangular region in the video data.

Example 54 include the apparatus of any of Examples 52 to 53, wherein the logic is further to decode one or more of tier and level information for the sub-picture set based on a message in the video data.

Example 55 includes the apparatus of any of Example 52 to 53 wherein the logic is further to determine a sub-picture parameter from a parameter set in the video data, and determine a size and position of a sub-picture based on a grid.

Example 56 include the apparatus of Example 55, wherein the logic is further to determine, based on an indication provided in a message in the video data, that the level for any sub-picture or sub-picture set is to be derived based on scaling of the picture size relative to one of the sub-picture and a sub-picture set sample size.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An apparatus comprising:
interface circuitry;
machine-readable instructions; and
at least one processor circuit to be programmed based on the machine-readable instructions to:
populate a supplemental enhancement information (SEI) message with a value corresponding to a number of subpictures of a video sequence;
populate a level indicator in the SEI message;
populate a subpicture identifier;
populate the subpicture identifier in a slice header;
set a flag in the SEI message to indicate that tier information is present in a sequence parameter set syntax structure; and
cause the SEI message and the slice header to be included in a video bitstream.

2. The apparatus of claim 1, wherein the level indicator is to indicate decoder interoperability for the video sequence.

3. The apparatus of claim 1, wherein one or more of the at least one processor circuit is to populate a maximum sublayers value in the sequence parameter set syntax structure.

4. The apparatus of claim 1, wherein one or more of the at least one processor circuit is to populate a number of sublayers value in the sequence parameter set syntax structure.

5. The apparatus of claim 1, wherein the video sequence is a coded video sequence.

6. The apparatus of claim 1, wherein one or more of the at least one processor circuit is to determine the level indicator based on sealing a max luma sample rate for a level of the video sequence scaled by a ratio of a subpicture set size to a picture size.

7. The apparatus of claim 1, wherein one or more of the at least one processor circuit is to:
populate the subpicture identifier in the sequence parameter set syntax structure; and
cause the sequence parameter set syntax structure to be included in the video bitstream.

8. The apparatus of claim 1, wherein the subpicture identifier is associated with a slice corresponding to the slice header.

9. At least one non-transitory machine-readable medium comprising machine-readable instructions to cause at least one processor circuit to at least:
populate a supplemental enhancement information (SEI) message with a value corresponding to a number of subpictures of a video sequence;
populate a level indicator in the SEI message;
populate a subpicture identifier;
populate the subpicture identifier in a slice header;
set a flag in the SEI message to indicate that tier information is present in a sequence parameter set syntax structure; and
cause the SEI message and the slice header to be included in a video bitstream.

10. The at least one non-transitory machine-readable medium of claim 9, wherein the machine-readable instructions are to cause one or more of the at least one processor circuit to populate a maximum sublayers value in the sequence parameter set syntax structure.

11. The at least one non-transitory machine-readable medium of claim 9, wherein the machine-readable instructions are to cause one or more of the at least one processor circuit to populate a number of sublayers value in the sequence parameter set syntax structure.

12. The at least one non-transitory machine-readable medium of claim 9, wherein the machine-readable instructions are to cause one or more of the at least one processor circuit to determine the level indicator based on a max luma sample rate for a level of the video sequence scaled by a ratio of a subpicture set size to a picture size.

13. The at least one non-transitory machine-readable medium of claim 9, wherein the machine-readable instructions are to cause one or more of the at least one processor circuit to:
populate the subpicture identifier in the sequence parameter set syntax structure; and
cause the sequence parameter set syntax structure to be included in the video bitstream.

14. The at least one non-transitory machine-readable medium of claim 9, wherein the subpicture identifier is associated with a slice corresponding to the slice header.

15. An apparatus comprising:
interface circuitry;
machine-readable instructions; and
at least one processor circuit to be programmed by the machine-readable instructions to:
access a video bitstream;
access a subpicture identifier in a slice header of the video bitstream;
identify a subpicture set from the video bitstream to be decoded;
decode a level indicator for the subpicture set based on a supplemental enhancement information (SEI) message in the video bitstream; and
determine whether the level indicator satisfies a threshold.

16. The apparatus of claim 15, wherein the level indicator is to indicate decoder interoperability for the video bitstream.

17. The apparatus of claim 15, wherein the subpicture identifier is associated with a slice corresponding to the slice header.

18. The apparatus of claim 15, wherein the video bitstream is based on 360 video coding, and one or more of the at least one processor circuit is to:
select the subpicture set from a region of the 360 video coding of the video bitstream; and
decode the subpicture set.

19. The at least one non-transitory machine-readable medium of claim 9, wherein the level indicator is to indicate decoder interoperability for the video sequence.

* * * * *